UNITED STATES PATENT OFFICE.

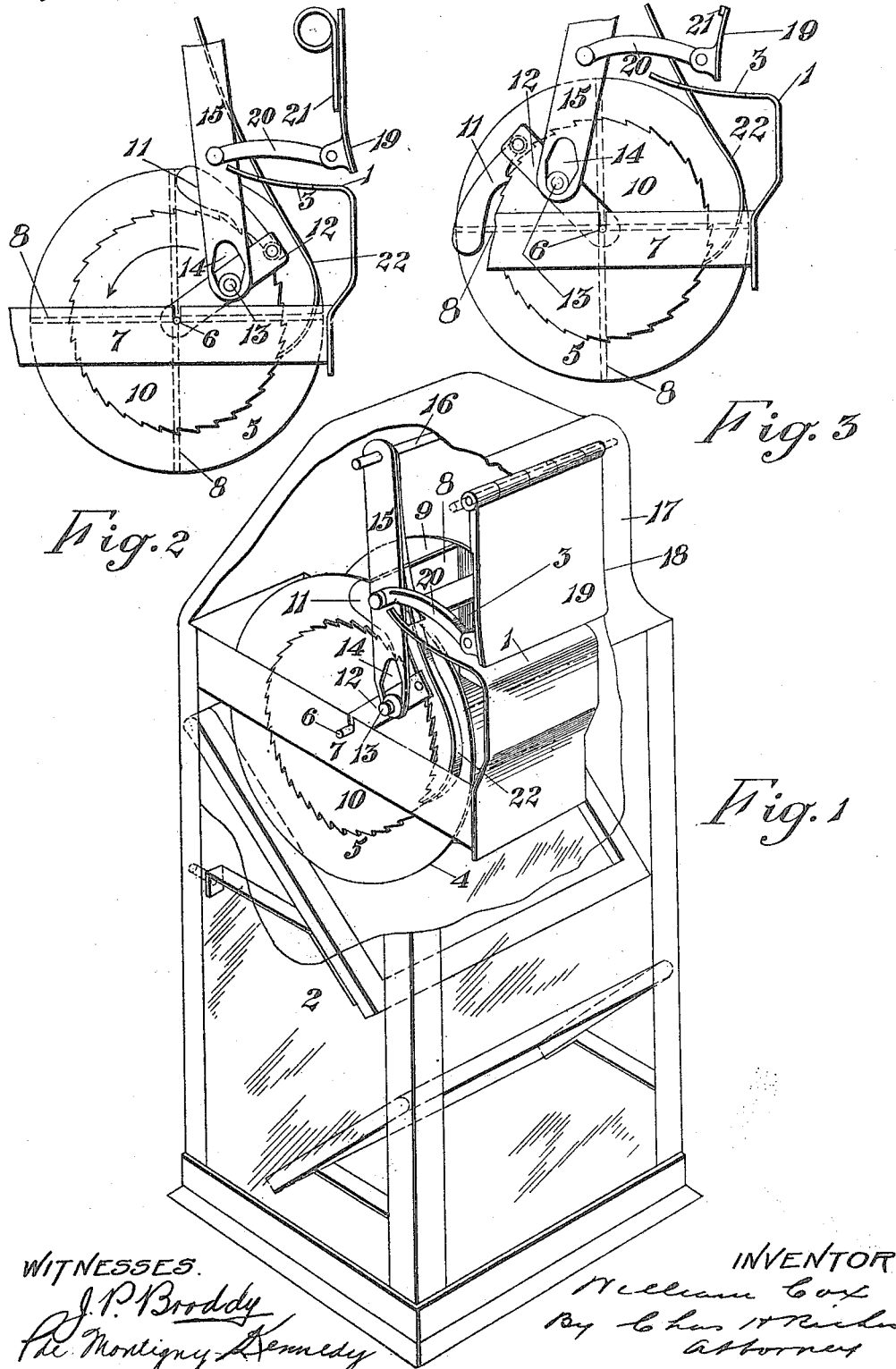

WILLIAM COX, OF TORONTO, ONTARIO, CANADA.

FARE-BOX.

1,135,261. Specification of Letters Patent. Patented Apr. 13, 1915.

Application filed June 1, 1914. Serial No. 842,290.

*To all whom it may concern:*

Be it known that I, WILLIAM COX, of the city of Toronto, in the county of York and the Province of Ontario, Dominion of Canada, have invented certain new and useful Improvements in Fare-Boxes; and I hereby declare that the following is a clear, full, and exact description of the same.

My invention relates to a fare box in which the examining chamber is provided with a revoluble trap having one or more compartments successively brought, during the revolution of the trap, into position below the fare receiving slot, the entrance to which is controlled by a movable cover which must be displaced from its normal position before the fare can be inserted in the fare box, and which automatically returns to a normal position thereafter; said cover, during its return movement, operating to cause the revolution, or partial revolution, of the trap, whereby the coin admitted through the fare receiving slot will be deposited in the examining chamber and prevented thereafter from being extracted therefrom.

For an understanding of my invention, reference is to be had to the following description and to the accompanying drawings, in which—

Figure 1, is a broken perspective view of the examining chamber of a fare box showing the trap therein; Fig. 2, is a detail view of the operating mechanism for the trap shown in Fig. 1, with the parts in their normal position; and Fig. 3 is a similar view to Fig. 2, with the parts in their operated condition.

Like characters of reference refer to like parts throughout the specification and drawings.

In the top 1 of the examining chamber 2 is a fare receiving slot 3 through which the fares are admitted into the fare box and revoluble within the examining chamber 2 is a trap 4. This trap consists of two circular shaped side plates 5, having trunnions 6 journaled in suitable bearings 7 in the examining chamber, and radial partitions 8 connected to the interior faces of the side plates 5 to form a series of compartments 9, which are brought successively into position with the fare receiving slot 3 during the rotation of the trap. Attached to, or forming part of, one of the side plates 5 is a ratchet wheel 10 and engaging with the ratchet wheel 10 is a pawl 11 pivoted to a lever 12 fulcrumed on the adjacent trunnion 6. The lever 12 is provided with a pin 13 contained in the slotted end 14 of the swinging arm 15 movably hung from a rod 16 journaled in the top of the hood 17 of the examining chamber. The front of the hood 17 is formed with an opening 18 for the fares to be inserted through the fare receiving slot 3 into the examining chamber 2. Normally covering the opening 18 is a cover plate 19 hinged to the front of the hood 17 and connected to the cover 19 and the arm 15 is a link 20 by which the movement of the cover is imparted to the arm.

The normal position of the parts is that shown in Figs. 1 and 2 and in this position the cover 19 closes the opening 18 and shuts off all access to the fare receiving slot 3 until the cover has been displaced from its normal position as shown in Fig. 3. To introduce a fare into the examining chamber the cover 19 is pressed inward until the fare receiving slot 3 is accessible. The inward movement of the cover 19 by means of the link 20 changes the position of the arm 15, lever 12 and pawl 11 from that shown in Figs. 1 and 2 to that shown in Fig. 3. The pawl 11 during its movement to the position shown in Fig. 3 slides freely over the teeth of the ratchet wheel 10. In the position shown in Fig. 3, the pawl is ready to cause a partial revolution of the trap when the cover 19 moves back to the position shown in Fig. 1, the return movement of the cover 19 being effected by a spring 21 secured to the hood 17 on the inner side of the cover 19 and normally bearing against the latter to automatically and immediately return it to a normal position when the cover is relieved of its inward pressure. When the fare is admitted through the fare receiving slot 3, it enters into the compartment 9, at the time being immediately below the fare receiving slot, and when the cover 19 swings back into its normal position under the influence of the spring 21, it brings with it the arm 15, the lever 12, and the pawl 11, causing the pawl 11 by its engagement with the teeth of the ratchet wheel 10 to rotate the trap until the compartment with the fare in it has been turned to deposit the fare in the examining chamber; this movement of the trap bringing another compartment into line with the fare receiving slot. To prevent the rotation of the trap in the reverse direction during the inward movement of the cover and the corresponding movement of its related parts, I have provided the trap with a detent spring 22 which engages the teeth of the ratchet wheel and operates to prevent its reverse rotation. By means of this construction, I am able to intermittently rotate the trap a partial revolution whenever a fare has been inserted through the fare receiving slot, immediately deposit that fare in the examining chamber and effectively shut off all communication between the examining chamber and fare receiving slot so that the fare cannot be extracted therefrom.

Having described my invention, what I claim is:

In a fare box comprising an examining chamber having a fare-receiving entrance, the combination of an intermittently-rotating trap, a ratchet wheel causing its rotation, a lever, a pawl pivoted to the lever and engaging with the ratchet wheel, a pin projecting from said lever, a swinging arm, having an elongated slot therein to receive said pin and cause the movement of the lever during the swinging movement of the arm, a displaceable cover hinged to the fare box to close said entrance, a link pivotally connected to said cover and arm whereby the displacement of the cover will set the pawl for the rotation of the trap, and a spring to reverse the movement of the cover and its related parts.

Toronto, May 20th, 1914.

WILLIAM COX.

Witnesses:
 CHAS. H. RICHES,
 PAR MONTIGNY KENNEDY.